US009121964B2

(12) United States Patent
Lewis et al.

(10) Patent No.: US 9,121,964 B2
(45) Date of Patent: Sep. 1, 2015

(54) PARAMETERIZING A GEOLOGICAL SUBSURFACE FEATURE

(75) Inventors: Winston R. Lewis, Houston, TX (US); Eugene William Starr, Willis, TX (US); Jason Dressel, Katy, TX (US)

(73) Assignee: WesternGeco L.L.C., Houston, TX (US)

( * ) Notice: Subject to any disclaimer, the term of this patent is extended or adjusted under 35 U.S.C. 154(b) by 371 days.

(21) Appl. No.: 13/619,508

(22) Filed: Sep. 14, 2012

(65) Prior Publication Data

US 2013/0185040 A1 Jul. 18, 2013

Related U.S. Application Data

(60) Provisional application No. 61/586,659, filed on Jan. 13, 2012.

(51) Int. Cl.
*G01V 1/28* (2006.01)

(52) U.S. Cl.
CPC .............. *G01V 1/28* (2013.01); *G01V 2210/67* (2013.01)

(58) Field of Classification Search
None
See application file for complete search history.

(56) References Cited

U.S. PATENT DOCUMENTS

| 7,526,131 | B2 | 4/2009 | Weber |
|---|---|---|---|
| 2011/0002194 | A1 | 1/2011 | Imhof et al. |
| 2011/0064286 | A1 | 3/2011 | Chien et al. |
| 2011/0090760 | A1 | 4/2011 | Rickett et al. |
| 2011/0115787 | A1 | 5/2011 | Kadlec |
| 2013/0246031 | A1* | 9/2013 | Wu et al. .................. 703/10 |

OTHER PUBLICATIONS

Hajihashemi et al., "High performance computing for the level-set reconstruction algorithm", Journal of Parallel and Distributed Computing, vol. 70, Issue 6, Jun. 2010, pp. 671-679.*
Burger et al., "A Survey on Level Set Methods for Inverse Problems and Optimal Design", European Journal of Applied Mathematics, vol. 16, 2005, pp. 263-301.*
International Search Report and Written Opinion of PCT Application No. PCT/US2013/021289 dated Apr. 30, 2013: pp. 1-9.
Burger, "A level set method for inverse problems," Inverse Problems, 2001, vol. 17: pp. 1327-1355.
Burger, "A framework for the construction of level set methods for shape optimization and reconstruction," Interfaces and Free Boundaries, 2003, vol. 5: pp. 301-329.

(Continued)

*Primary Examiner* — Omar Fernandez Rivas
*Assistant Examiner* — Herng-Der Day
(74) *Attorney, Agent, or Firm* — Abimbola Bukoye

(57) ABSTRACT

A method to parameterize the geometry of a geological, subsurface feature such as a salt body is provided. Data corresponding to a subsurface, geological formation is acquired. The acquired formation data corresponds to a subsurface body having a certain geometry and a subsurface region. At least part of the subsurface body geometry is directly inverted into an inversion domain. The direct inversion includes partitioning the inversion domain into a first partitioned region, corresponding at least in part to the subsurface body, and a second partitioned region. The inversion further uses a level set representation to parameterize the subsurface body geometry. A computing system that includes a processor, a memory, and one or more programs stored in the memory is also provided. The programs comprise instructions that, when executed by the processor, are configured to perform the provided method.

19 Claims, 15 Drawing Sheets

(56) References Cited

OTHER PUBLICATIONS

Dorn et al., "A shape reconstruction method for electromagnetic tomography using adjoint fields and level sets," Inverse Problems, 2000, vol. 16: pp. 1119-1156.

Dorn et al., "Shape reconstruction in 2D from limited-view multifrequency electromagnetic data," Contemporary Mathematics, 2001, vol. 278: pp. 97-122.

Fedkiw et al., "A Non-oscillatory Eulerian Approach to Interfaces in Multimaterial Flows (the Ghost Fluid Method)," Journal of Computational Physics, 1999, vol. 152: pp. 457-492.

Li et al., "Inversion of controlled-source electromagnetic data using a model-based approach," Geophysical Prospecting, 2010, vol. 2010(58): pp. 455-467.

Osher et al., "Fronts Propagating with Curvature-Dependent Speed: Algorithms Based on Hamilton-Jacobi Formulations," Journal of Computational Physics, 1988, vol. 79: pp. 12-49.

Osher et al., "Level Set Methods for Optimization Problems Involving Geometry and Constraints I. Frequencies of a Two-Density Inhomogeneous Drum," Journal of Computational Physics, 2001, vol. 171: pp. 272-288.

Santosa, "A Level-Set Approach for Inverse Problems Involving Obstacles," ESAIM: Control, Optimisation and Calculus of Variations, Jan. 1996, vol. 1: pp. 17-33.

Tarantola, "Linearized Inversion of Seismic Reflection Data," Geophysical Prospecting, 1984, vol. 32: pp. 998-1015.

Vigh et al., "3D Full waveform inversion on a Gulf of Mexico WAZ data set," SEG Denver Annual Meeting, 2010: pp. 957-961.

Virieux et al., "An overview of full-waveform inversion in exploration geophysics," Geophysics, Nov.-Dec. 2009, vol. 74(6): pp. WCC1-WCC26.

Zhang et al., "A model-based inversion algorithm for controlled-source electromagnetic data," IEEE, 2007: pp. 1805-1808.

\* cited by examiner

PARAMETERIZING A GEOLOGICAL SUBSURFACE FEATURE

CROSS-REFERENCE TO RELATED APPLICATION

This application claims the benefit of U.S. Provisional Patent Application No. 61/586,659 filed Jan. 13, 2012, which is incorporated by reference herein in its entirety.

BACKGROUND

Full-waveform inversion (FWI) is a method that may be used to build, for example, a high resolution seismic velocity model from the nonlinear, iterative minimization of the misfit between observed and synthetic data. The task of accurately recovering the geometry of salt bodies, typically found in geologically complex marine environments like the Gulf of Mexico, presents a great challenge to FWI for many reasons, one of which being the lack of low frequencies in the data. Therefore, the salt geometry often must be manually picked by seismic interpreters, which is not only subjective but is also a time-consuming and costly process. It also has proved difficult to invert density using traditional FWI when using, for example, the Gardner approximation at a subsurface boundary. Better definition of the salt geometry has been shown to improve imaging in the subsalt sedimentary regions.

SUMMARY

In accordance with some embodiments, a method is performed that includes: acquiring data corresponding to a subsurface, geological formation, wherein the acquired data includes data corresponding to a subsurface body having a certain geometry and a subsurface region; and directly inverting into an inversion domain at least part of the subsurface body geometry, wherein the direct inverting includes partitioning the inversion domain into a first partitioned region, corresponding at least in part to the subsurface body, and a second partitioned region, and using a level set representation to parameterize the subsurface body geometry.

In accordance with some embodiments, a computing system is provided that includes at least one processor, at least one memory, and one or more programs stored in the at least one memory, wherein the one or more programs are configured to be executed by the one or more processors, the one or more programs including instructions for: acquiring data corresponding to a subsurface, geological formation, wherein the acquired data includes data corresponding to a subsurface body having a certain geometry and a subsurface region; and directly inverting into an inversion domain at least part of the subsurface body geometry, wherein the direct inverting includes partitioning the inversion domain into a first partitioned region, corresponding at least in part to the subsurface body, and a second partitioned region, and using a level set representation to parameterize the subsurface body geometry.

In accordance with some embodiments, a computer readable storage medium is provided, the medium having a set of one or more programs including instructions that when executed by a computing system cause the computing system to: acquire data corresponding to a subsurface, geological formation, wherein the acquired data includes data corresponding to a subsurface body having a certain geometry and a subsurface region; and directly invert into an inversion domain at least part of the subsurface body geometry, wherein the direct inverting includes partitioning the inversion domain into a first partitioned region, corresponding at least in part to the subsurface body, and a second partitioned region, and using a level set representation to parameterize the subsurface body geometry.

In accordance with some embodiments, a computing system is provided that includes at least one processor, at least one memory, and one or more programs stored in the at least one memory; and means for acquiring data corresponding to a subsurface, geological formation, wherein the acquired data includes data corresponding to a subsurface body having a certain geometry and a subsurface region; and means for directly inverting into an inversion domain at least part of the subsurface body geometry, wherein the direct inverting includes partitioning the inversion domain into a first partitioned region, corresponding at least in part to the subsurface body, and a second partitioned region, and using a level set representation to parameterize the subsurface body geometry.

In accordance with some embodiments, an information processing apparatus for use in a computing system is provided, and includes means for acquiring data corresponding to a subsurface, geological formation, wherein the acquired data includes data corresponding to a subsurface body having a certain geometry and a subsurface region; and means for directly inverting into an inversion domain at least part of the subsurface body geometry, wherein the direct inverting includes partitioning the inversion domain into a first partitioned region, corresponding at least in part to the subsurface body, and a second partitioned region, and using a level set representation to parameterize the subsurface body geometry.

In accordance with some embodiments, a method is performed that includes: acquiring data corresponding to a subsurface, geological formation, wherein the acquired data includes data corresponding to a subsurface body having a certain geometry and a subsurface region; and performing a full waveform inversion using a level set representation to parameterize the subsurface body geometry.

In accordance with some embodiments, a computing system is provided that includes at least one processor, at least one memory, and one or more programs stored in the at least one memory, wherein the one or more programs are configured to be executed by the one or more processors, the one or more programs including instructions for: acquiring data corresponding to a subsurface, geological formation, wherein the acquired data includes data corresponding to a subsurface body having a certain geometry and a subsurface region; and performing a full waveform inversion using a level set representation to parameterize the subsurface body geometry.

In accordance with some embodiments, a computer readable storage medium is provided, the medium having a set of one or more programs including instructions that when executed by a computing system cause the computing system to: acquire data corresponding to a subsurface, geological formation, wherein the acquired data includes data corresponding to a subsurface body having a certain geometry and a subsurface region; and perform a full waveform inversion using a level set representation to parameterize the subsurface body geometry.

In accordance with some embodiments, a computing system is provided that includes at least one processor, at least one memory, and one or more programs stored in the at least one memory; and means for acquiring data corresponding to a subsurface, geological formation, wherein the acquired data includes data corresponding to a subsurface body having a certain geometry and a subsurface region; and means for performing a full waveform inversion using a level set representation to parameterize the subsurface body geometry.

In accordance with some embodiments, an information processing apparatus for use in a computing system is provided, and includes means for acquiring data corresponding to a subsurface, geological formation, wherein the acquired data includes data corresponding to a subsurface body having a certain geometry and a subsurface region; and means for performing a full waveform inversion using a level set representation to parameterize the subsurface body geometry.

In accordance with some embodiments, a method is performed that includes: acquiring data corresponding to a subsurface, geological formation, wherein the acquired data includes data corresponding to a subsurface body having a certain geometry and a subsurface region; and using a level set representation to parameterize the subsurface body geometry.

In accordance with some embodiments, a computing system is provided that includes at least one processor, at least one memory, and one or more programs stored in the at least one memory, wherein the one or more programs are configured to be executed by the one or more processors, the one or more programs including instructions for acquiring data corresponding to a subsurface, geological formation, wherein the acquired data includes data corresponding to a subsurface body having a certain geometry and a subsurface region; and using a level set representation to parameterize the subsurface body geometry.

In accordance with some embodiments, a computer readable storage medium is provided, the medium having a set of one or more programs including instructions that when executed by a computing system cause the computing system to: acquire data corresponding to a subsurface, geological formation, wherein the acquired data includes data corresponding to a subsurface body having a certain geometry and a subsurface region; and use a level set representation to parameterize the subsurface body geometry.

In accordance with some embodiments, a computing system is provided that includes at least one processor, at least one memory, and one or more programs stored in the at least one memory; and means for acquiring data corresponding to a subsurface, geological formation, wherein the acquired data includes data corresponding to a subsurface body having a certain geometry and a subsurface region; and means for using a level set representation to parameterize the subsurface body geometry.

In accordance with some embodiments, an information processing apparatus for use in a computing system is provided, and includes means for acquiring data corresponding to a subsurface, geological formation, wherein the acquired data includes data corresponding to a subsurface body having a certain geometry and a subsurface region; and means for using a level set representation to parameterize the subsurface body geometry.

In some embodiments, an aspect of the invention includes that the subsurface body comprises a salt body and the subsurface region comprises a sediment region.

In some embodiments, an aspect of the invention includes that the direct inverting further comprises defining an implicit model using a level set function; mapping the implicit model onto a grid; generating an objective function and determining a gradient of the objective function; at an iteration, perturbing the level set boundary by evolving the level set function; and stopping the evolution of the level set function when the step length along the time dimension (time step) meets one or more predetermined conditions.

In some embodiments, an aspect of the invention includes that a direction for the determined time step is determined using a technique selected from the group consisting of a steepest descent direction, a conjugate gradient direction, a Newton direction, and a quasi-Newton direction.

In some embodiments, an aspect of the invention includes that the direct inverting further comprises, if using a steepest descent method to determine a direction for the time step, using a negative of the gradient as a force acting on the level set boundary to evolve the level set function.

In some embodiments, an aspect of the invention includes that a zero level set of the level set function represents the boundary of the domain being inverted.

In some embodiments, an aspect of the invention involves providing a continuous extension of the gradient off of the level set boundary.

In some embodiments, an aspect of the invention includes that the direct inverting further comprises, if the gradient is defined only on the level set boundary and a level set evolution equation is used to evolve the level set function, choosing the level set function to be a signed distance function; constructing the signed distance function; and computing a constant extrapolation of the gradient along a direction normal to the boundary.

In some embodiments, an aspect of the invention includes that the evolving the level set function comprises using an equation of motion.

In some embodiments, an aspect of the invention includes that the objective function is a least-squares formulation.

In some embodiments, an aspect of the invention includes that the direct inversion further comprises determining the misfit between the acquired data and synthetic data.

In some embodiments, an aspect of the invention includes that the level set representation is positive if representing the first partitioned region and negative if representing the second partitioned region.

In some embodiments, an aspect of the invention includes that the direct inversion comprises a full waveform inversion.

In some embodiments, an aspect of the invention involves determining the geometry of the subsurface body.

In some embodiments, an aspect of the invention involves plotting velocity profiles of the subsurface body.

This summary is provided to introduce a selection of concepts that are further described below in the detailed description. This summary is not intended to identify key or essential features of the claimed subject matter, nor is it intended to be used as an aid in limiting the scope of the claimed subject matter.

FIGURES

Embodiments of processing acquired data for geophysical interpretation are described with reference to the following figures. The same numbers are generally used throughout the figures to reference like features and components.

FIG. 1 shows a flowchart in which acquired data is processed for geophysical interpretation, in accordance with the present disclosure.

FIG. 2 schematically shows a level set function and its domain, in accordance with the present disclosure.

Figure 1:
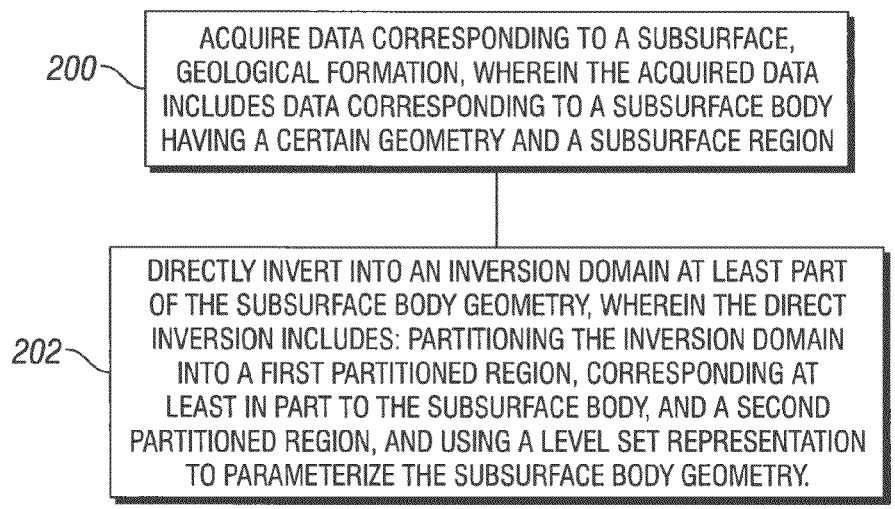

It should be understood that the drawings are not to scale and that the disclosed embodiments are sometimes illustrated diagrammatically and in partial views. In certain instances, details that are not necessary for an understanding of the disclosed method and apparatus or that would render other details difficult to perceive may have been omitted. It should be understood that this disclosure is not limited to the particular embodiments illustrated herein.

DETAILED DESCRIPTION

Some embodiments will now be described with reference to the figures. Like elements in the various figures may be referenced with like numbers for consistency. In the following description, numerous details are set forth to provide an understanding of various embodiments and/or features. However, it will be understood by those skilled in the art that some embodiments may be practiced without many of these details and that numerous variations or modifications from the described embodiments are possible. As used here, the terms "above" and "below," "up" and "down," "upper" and "lower," "upwardly" and "downwardly," and other like terms indicating relative positions above or below a given point or element are used in this description to more clearly describe certain embodiments. However, when applied to equipment and methods for use in wells that are deviated or horizontal, such terms may refer to a left to right, right to left or diagonal relationship, as appropriate.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the invention. The first object or step, and the second object or step, are both objects or steps, respectively, but they are not to be considered the same object or step.

The terminology used in the description of the invention herein is for the purpose of describing particular embodiments only and is not intended to be limiting of the invention. As used in the description of the invention and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

A system and method to parameterize the geometry of a subsurface feature (e.g., salt body) are disclosed. While this disclosure involves the procedure to accomplish full waveform inversion (FWI) using a level set approach to parameterize salt geometry and recover salt geometry from observed seismic data, those of ordinary skill in the art will recognize that the various disclosed embodiments may be applied in many contexts for many types of collected data to image features in a subsurface region.

In one embodiment, one may directly invert the geometry of subsurface features using FWI. Salt bodies, for example, are subsurface features for which the method disclosed herein may be used. Providing better definition of the salt geometry (e.g., boundary) improves the imaging in the subsalt sedimentary regions. The FWI technique may include partitioning the inversion domain into first (e.g., salt) and second (e.g., sediment) regions, and using a level set representation to parameterize the first body (salt) geometry. This is illustrated in a flowchart format in FIG. 1, which shows that data corresponding to a subsurface, geological formation is acquired, wherein the acquired data includes data corresponding to a subsurface body having a certain geometry and a subsurface region (200). At least part of the subsurface body geometry is directly inverted into an inversion domain, wherein the direct inversion includes: (1) partitioning the inversion domain into a first partitioned region corresponding at least in part to the subsurface body, and a second partitioned region; and (2) using a level set representation to parameterize the subsurface body geometry (202).

The classical least-squares formulation of the full waveform inversion problem can be described as follows. F is the function or forward modeling operator (F:M→$\mathfrak{R}^m$) that maps the property model (e.g., velocity, density, etc.) (x∈M ⊂ $\mathfrak{R}^n$), defined over the inversion domain D using a gridded representation, to the data domain, d, where d∈$\mathfrak{R}^m$ is the observed data. One solves the following optimization problem:

$$\min f(x) = \frac{1}{2}\|F(x) - d\|_2^2$$

At each (or one or more) iteration k, the model is updated according to the rule $x_{k+1}=x_k+\alpha_k p_k$, where $\alpha_k$ is the step length determined by a line search procedure, and the direction, $p_k$, could be, for example, depending on the optimization technique being used, one of steepest descent, conjugate gradient, or Newton/quasi-Newton direction.

Figure 2:
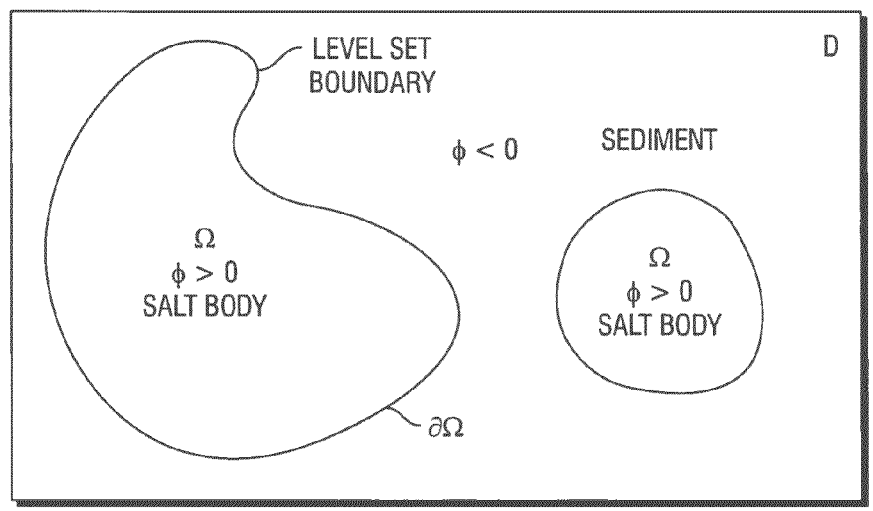

For any real-valued function $f$ that maps $\mathfrak{R}^k$ into $\mathfrak{R}$ ($f$: $\mathfrak{R}^k \to \mathfrak{R}$), a level set is the set for which the function takes on a given constant value, $\Gamma(\alpha)=\{x\in \mathfrak{R}^k: f(x)=\alpha\}$. The level set representation involves constructing a function, $\phi$, which maps $\mathfrak{R}^3$ into $\mathfrak{R}$ ($\phi: \mathfrak{R}^3 \to \mathfrak{R}$), such that its zero level set, $\Gamma(0)$, is the boundary, $\partial\Omega$, of the domain, $\Omega$, that we wish to represent and invert, as schematically illustrated in FIG. 2.

The level set function $f$ is made positive in $\Omega$ (e.g., the salt) and negative in $\Omega^c$ (e.g., the sediment). The level set approach may be adapted to solve for the salt geometry such that it requires minimal changes to the FWI algorithm and does not add significantly to the computational expense. Using the level set representation to parameterize the salt geometry, one may reformulate the inversion as follows.

Let $\hat{x}$ be the implicit model defined using a level set function $\phi \in D$, and let g be the operator that maps the implicit model onto a grid (g:D→M). The new objective function is then given by:

$$\min \hat{f}(\hat{x}) = \frac{1}{2}\|F(g(\hat{x})) - d\|_2^2.$$

The gradient of the new objective function is computed using the chain rule:

$$\nabla \hat{f}(\hat{x}) = \sum_{i=1}^{n} \frac{\partial f}{\partial x_i} \nabla g_i(\hat{x}),$$

where $g_i(\hat{x})=x_i$.

At each iteration (or one or more iterations), the perturbations to the level set boundary are made by evolving the level set function $\phi$. The equation of motion controlling the evolution of the level set function is given by;

$$\phi_t + V \cdot \nabla \phi - c\kappa|\nabla \phi|,$$

where $$\kappa = \nabla \cdot \left(\frac{\nabla \phi}{|\nabla \phi|}\right)$$

is the curvature of the surface, c≥0 is the curvature weight, and V is the directional force acting on the level set surface. By appropriately choosing the directional force V and solving the above differential equation, one can control the perturbations that are made to the level set surface, which in this case represents the salt geometry.

In accordance with the steepest descent method, we use the negative of the gradient as the force acting on the level set surface to evolve $\phi$. That is, at iteration k, evolve $\phi$ according to:

$$\phi_t - \nabla \hat{f}_k(\hat{x}_k) \cdot \nabla \phi = c\kappa|\nabla \phi|.$$

The evolution may be stopped when $\alpha_k=t_k-t_{k-1}$, the step length along the time dimension, meets certain conditions determined by a line search procedure. The line search ensures that the value of the objective function is reduced at every iteration. At the end of the iteration, the gradient is recomputed using the new solution for $\phi$ and a next iteration is performed using the newly computed gradient.

Figure 3:
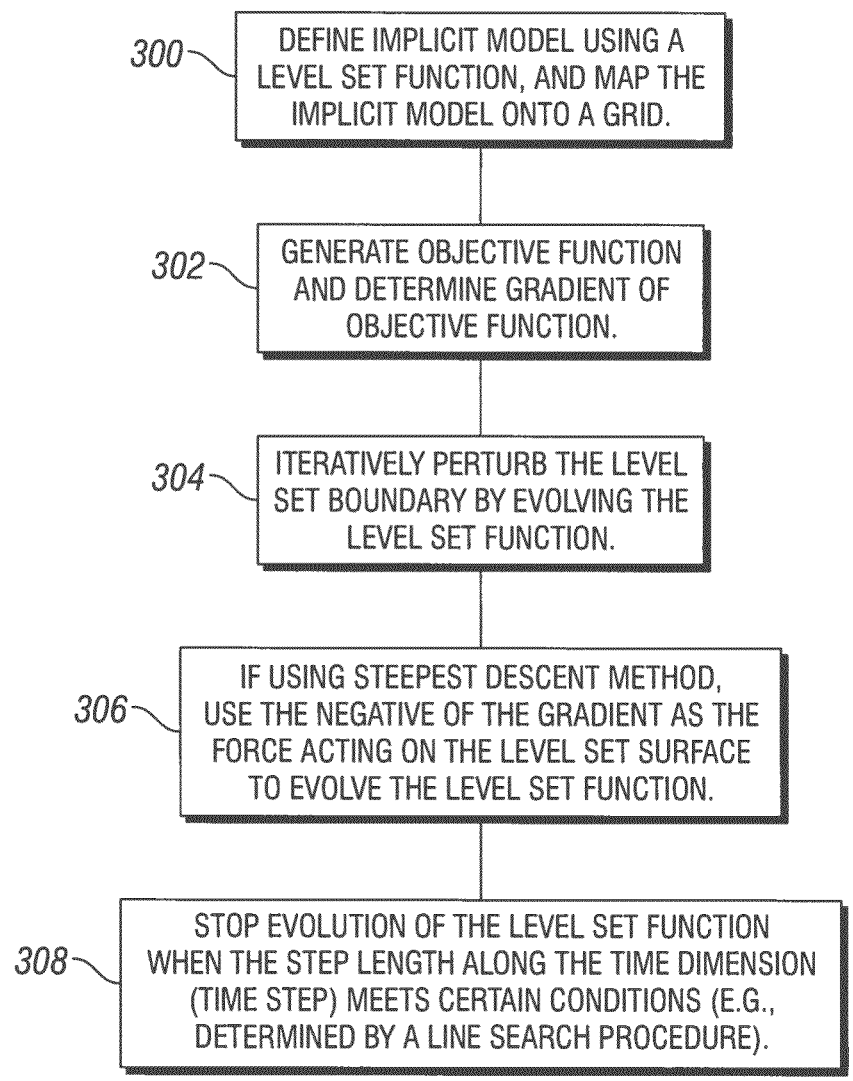
FIG. 3 shows a flowchart of an inversion workflow, in accordance with the present disclosure.

One embodiment of this inversion workflow is shown in a flowchart in FIG. 3 and summarized here: define implicit model using a level set function, and map the implicit model onto a grid (300); generate objective function and determine gradient of objective function (302); iteratively perturb the level set boundary by evolving the level set function (304); if using steepest descent method, use the negative of the gradient as the force acting on the level set surface to evolve the level set function (306); stop evolution of the level set function when the step length along the time dimension (time step) meets certain conditions (e.g., determined by a line search procedure) (308).

In some embodiments, the gradient $\nabla \hat{f}_k(\hat{x}_k)$ is defined only on the boundary, $\partial\Omega$. Thus, to use the level set evolution equation to evolve the level set function, we must provide a continuous extension of the gradient off the boundary, $\partial\Omega$, onto the gridded domain, D. There are several ways in which this can be done. According to one technique, we choose the level set function to be the signed distance function:

$$\phi(x) = \inf_{y \in \partial \Omega} \|x - y\|_2 S(\phi_0),$$

where $$S(\varphi) = \frac{\varphi}{\sqrt{\varphi^2 + \delta}}$$

and $$\varphi_0(x) = \begin{cases} 1 & x \in \Omega \\ -1 & x \in \Omega^c \end{cases}.$$

The signed distance function is constructed by solving the following differential equation:

$$\phi_t = S(\phi_0)(1 - |\nabla \phi|).$$

A constant extrapolation of the gradient along the normal direction to $\partial \Omega$ is then computed by solving the following advection equation:

$$I_t \pm \frac{\nabla \phi}{|\nabla \phi|} \cdot \nabla I = 0$$

where I is the quantity being advected. In our case, that will be the components of the gradient vector. Because we can assume that the perturbation to the boundary is small at a given iteration, this extrapolation step can be optimized (or improved) such that the gradient only has to be defined in a small neighborhood of the boundary $\partial \Omega$.

Figure 4:
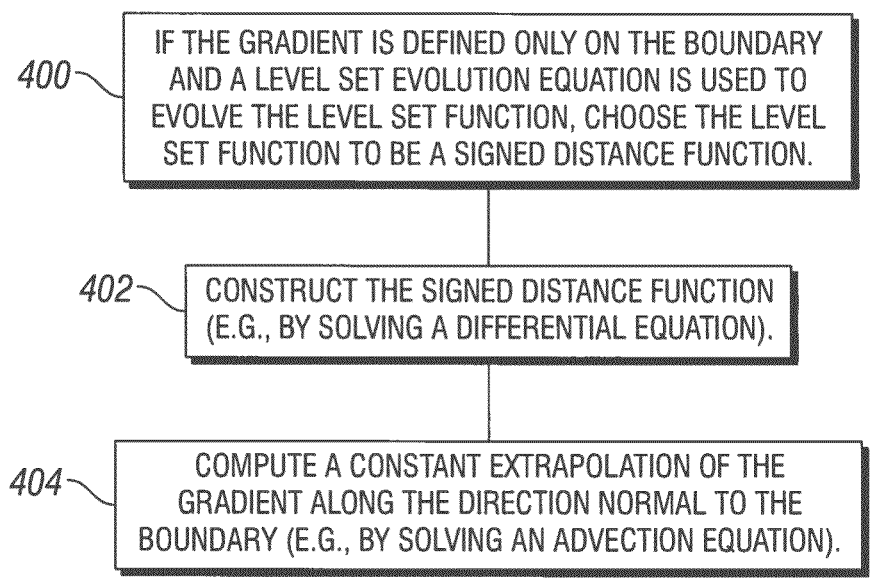
FIG. 4 shows a flowchart of an extrapolation workflow, in accordance with the present disclosure.

This extrapolation workflow is shown in a flowchart in FIG. 4 and summarized here: if the gradient is defined only on the boundary and a level set evolution equation is used to evolve the level set function, choose the level set function to be a signed distance function (400); construct the signed distance function (e.g., by solving a differential equation) (402); and compute a constant extrapolation of the gradient along the direction normal to the boundary (e.g., by solving an advection equation) (404).

Note that the following examples are non-limiting examples. In some embodiments, all of the steps disclosed herein may be used to process the acquired data. In other embodiments, a subset or a superset of the steps disclosed herein may be used. In yet other embodiments, steps disclosed herein may be combined and/or supplemented with other methods, techniques and processes known to those skilled in the art.

Figure 5:
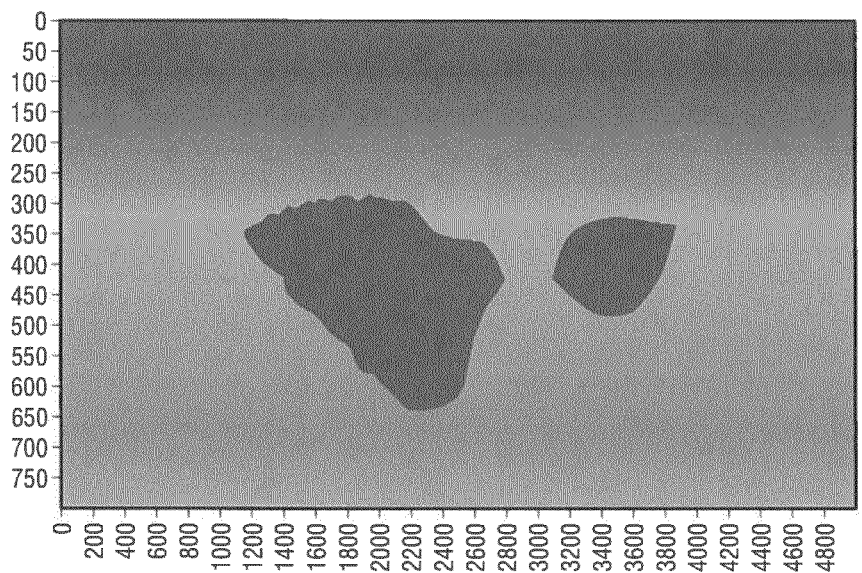
FIG. 5 shows a model having a linearly increasing velocity in the sediment region and two salt bodies, in accordance with the present disclosure.

One embodiment was tested using the 2D model shown in FIG. 5. This model has a linearly increasing velocity in the sediment region and has two salt bodies with geometries derived from the subsalt multiples attenuation and reduction technology (SMAART) Pluto 1.5 model. The velocity model is defined on a 5,000 (in X) by 800 (in depth) grid with a grid interval of 25 feet in both dimensions. The salt velocity is chosen to be constant at 14,800 ft./s. The observed data were synthetically generated using an acoustic propagator with true velocity and constant density. A fixed-spread acquisition geometry was used with a source interval of 75 feet and a receiver interval of 25 feet, with a record length of 8 seconds. The source depth was the same as the receiver depth: 25 feet.

Figure 6:
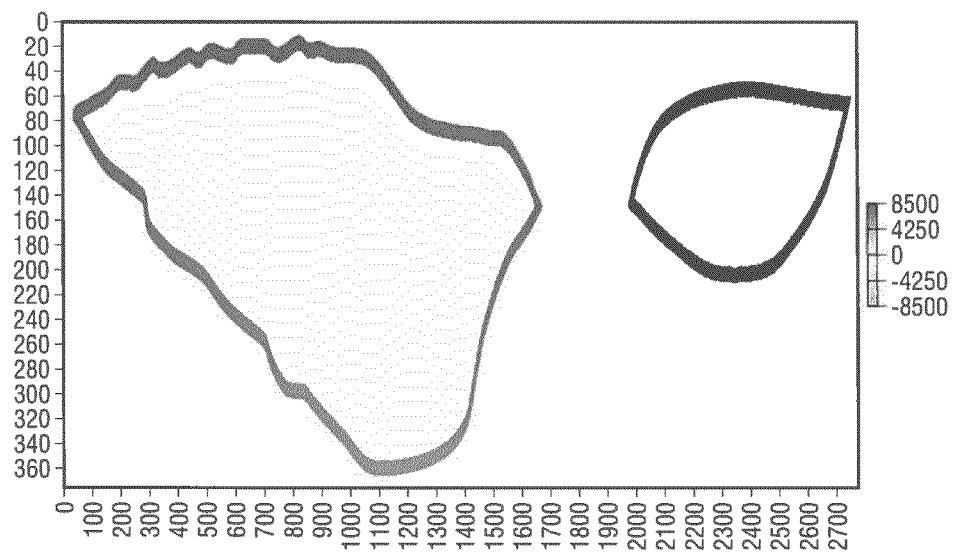
FIG. 6 is an example graph showing the difference between the true velocity and the starting velocity, in accordance with the present disclosure.
Figure 7:
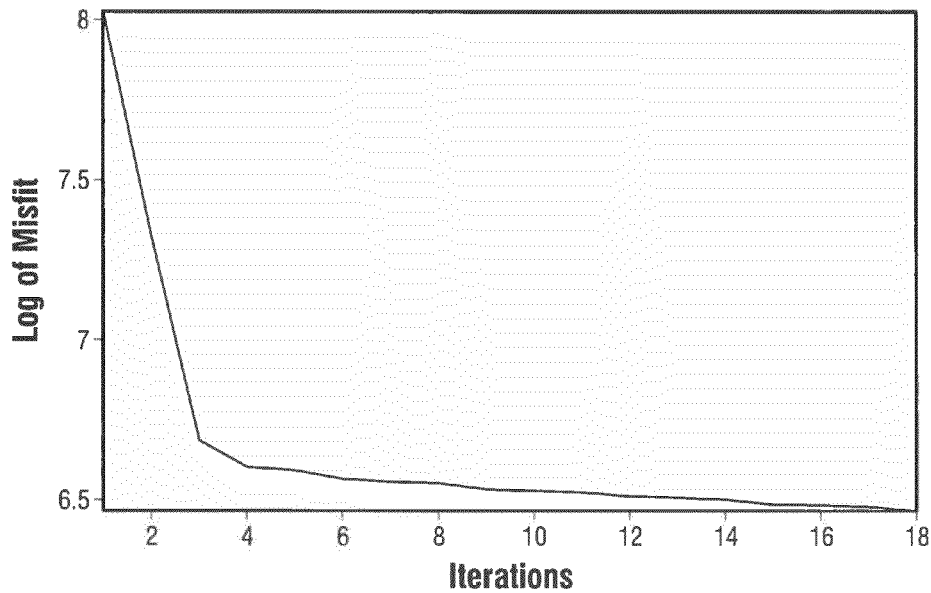
FIG. 7 is an example graph showing a log of data misfit versus iterations, in accordance with the present disclosure.
Figure 8:
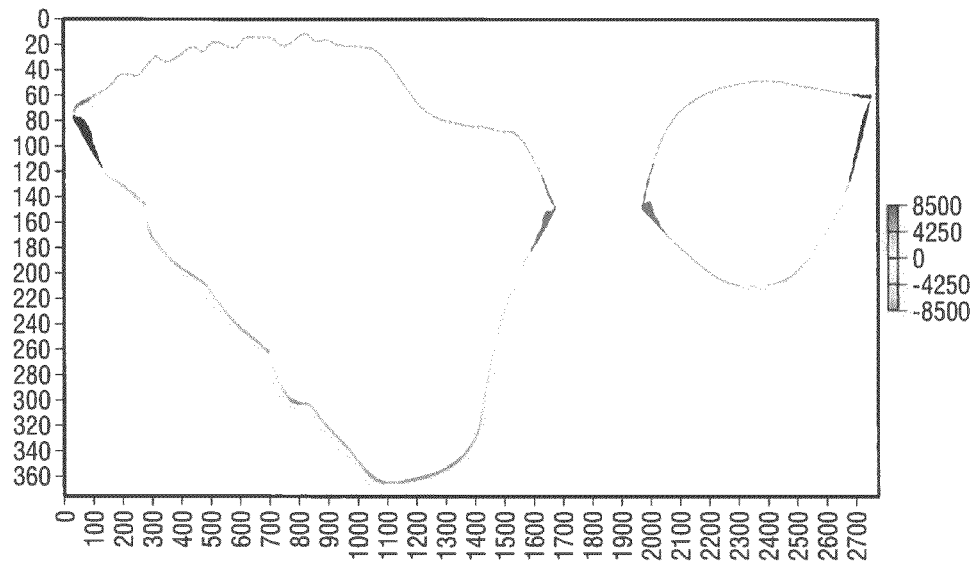
FIG. 8 is an example graph showing the difference between the true velocity and the inverted velocity, in accordance with the present disclosure.
Figure 9:
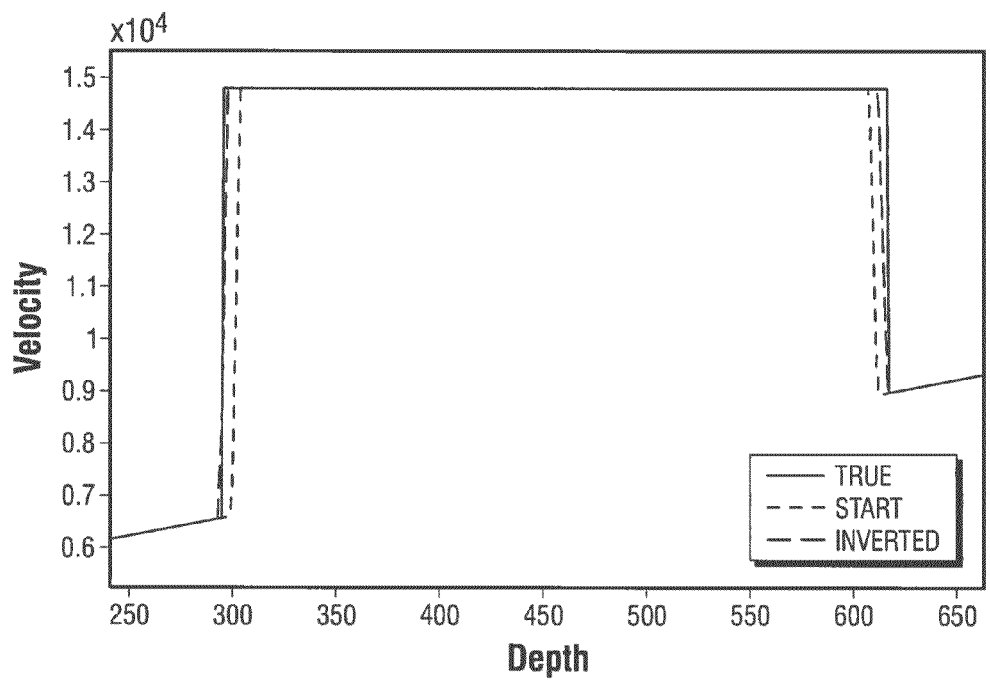
FIG. 9 is an example graph of the velocity depth profiles showing true velocity, starting velocity, and inverted velocity at x=2100 (52,500 ft.), in accordance with the present disclosure.
Figure 10:
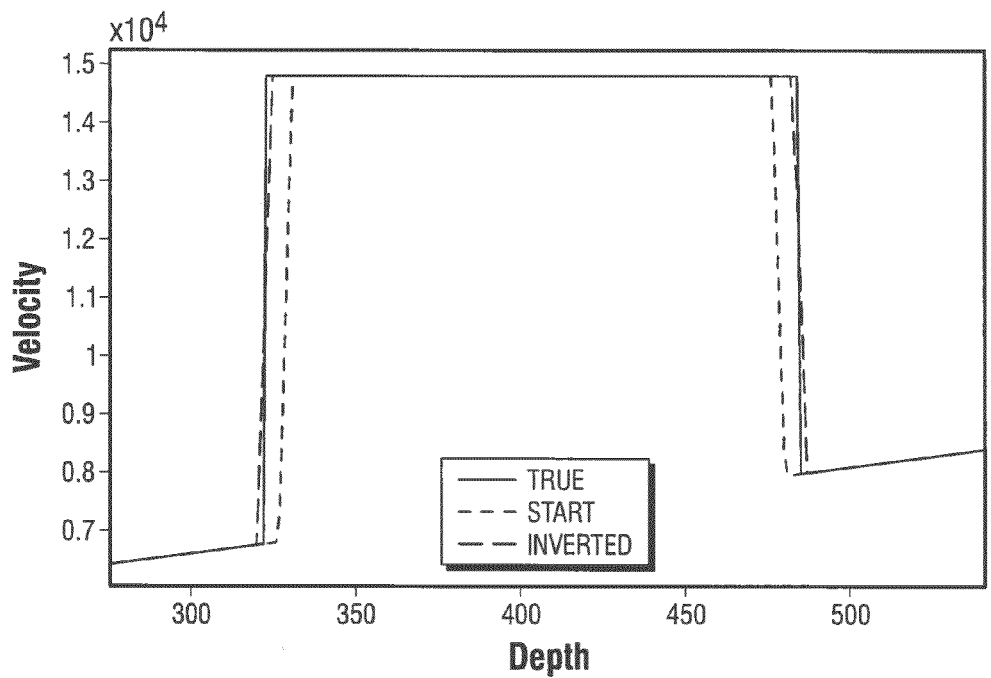
FIG. 10 is an example graph of the velocity depth profiles showing true velocity, starting velocity, and inverted velocity at x=3500 (87,500 ft.), in accordance with the present disclosure.

To generate the starting model for the inversion, the entire salt boundary was shrunk by a normal force to the surface. The background sediment velocity was assumed to be known and kept unchanged throughout the inversion. FIG. 6 shows the difference of the true velocity and the starting velocity for the inversion. The magnitude is zero everywhere except in the neighborhood of the salt boundary due to the shrunk salt used in the starting velocity model. The inversion using the level set approach was run starting with the shrunk salt model with a 3-Hz low-pass filter applied to both the predicted and observed data. The objective function (log of data misfit) monotonically decreases along the iterations as the inversion progresses, suggesting convergence as shown in FIG. 7. The converged solution can be seen in FIG. 8, which shows the difference of the true velocity and the inverted velocity after 18 iterations, and in FIGS. 9 and 10, which show the velocity profiles at x=2100 (52,500 ft.) and x=3500 (87,500 ft.), respectively.

Figure 11:
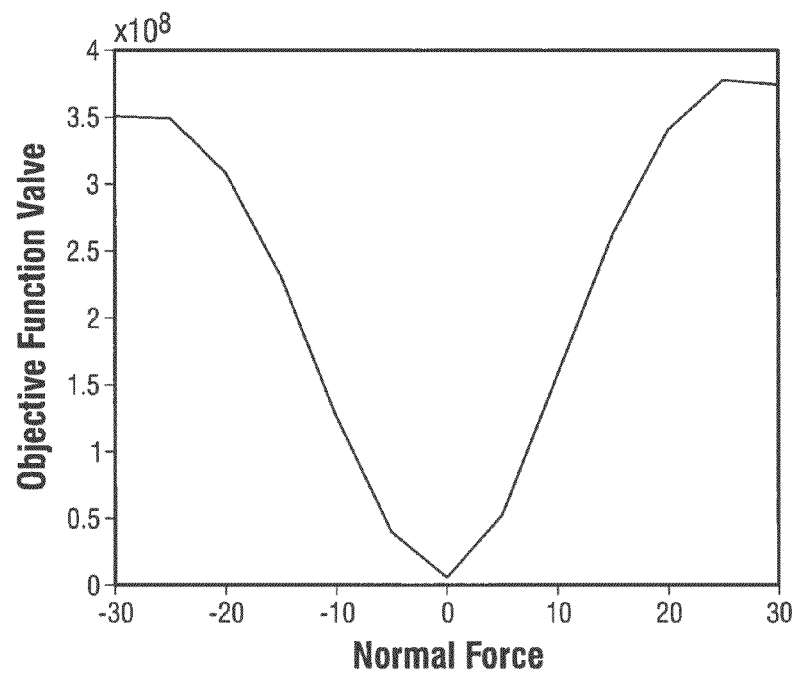
FIG. 11 is an example graph showing the objective function behavior as the salt geometry is shrunk (negative axis) and expanded (positive axis), in accordance with the present disclosure.
Figure 12:
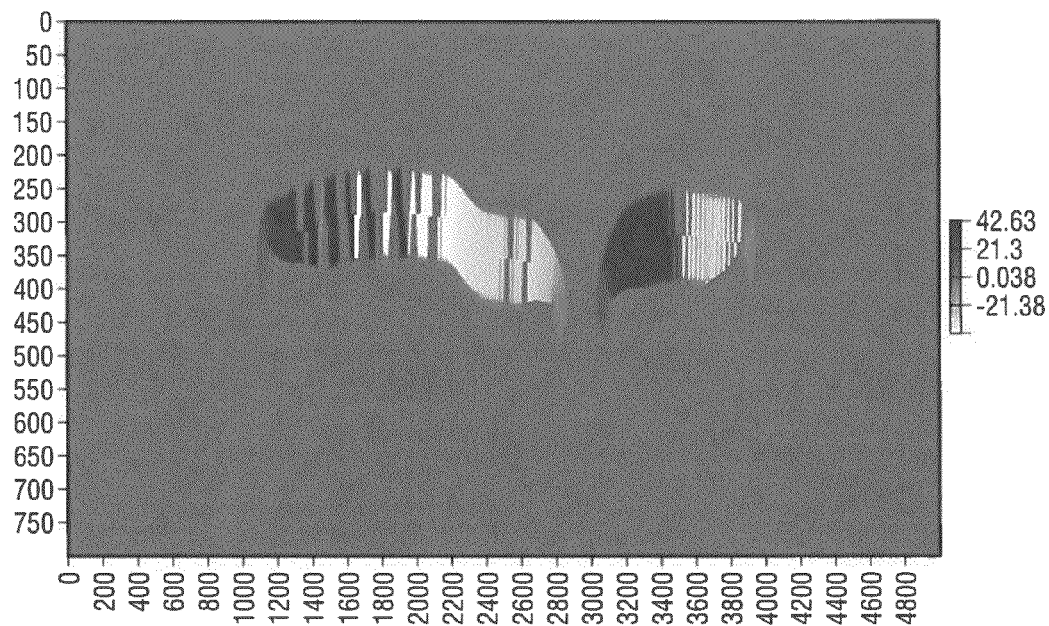
FIG. 12 is an example graph showing the steepest descent force on the level set function when the salt geometry is expanded (X component), in accordance with the present disclosure.
Figure 13:
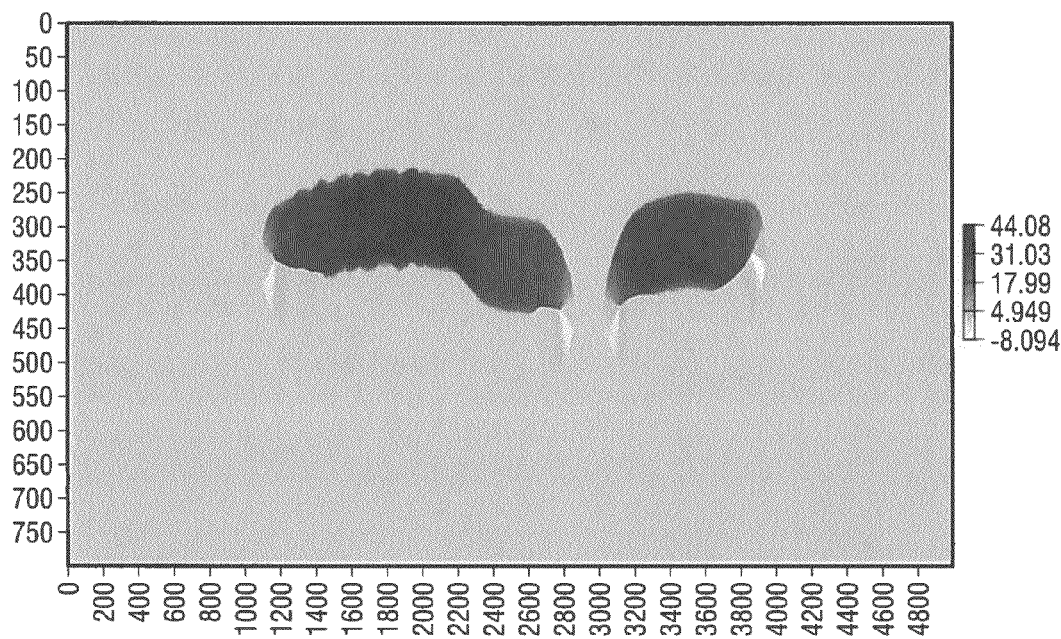
FIG. 13 is an example graph showing the steepest descent force on the level set function when the salt geometry is expanded (Z component), in accordance with the present disclosure.
Figure 14:
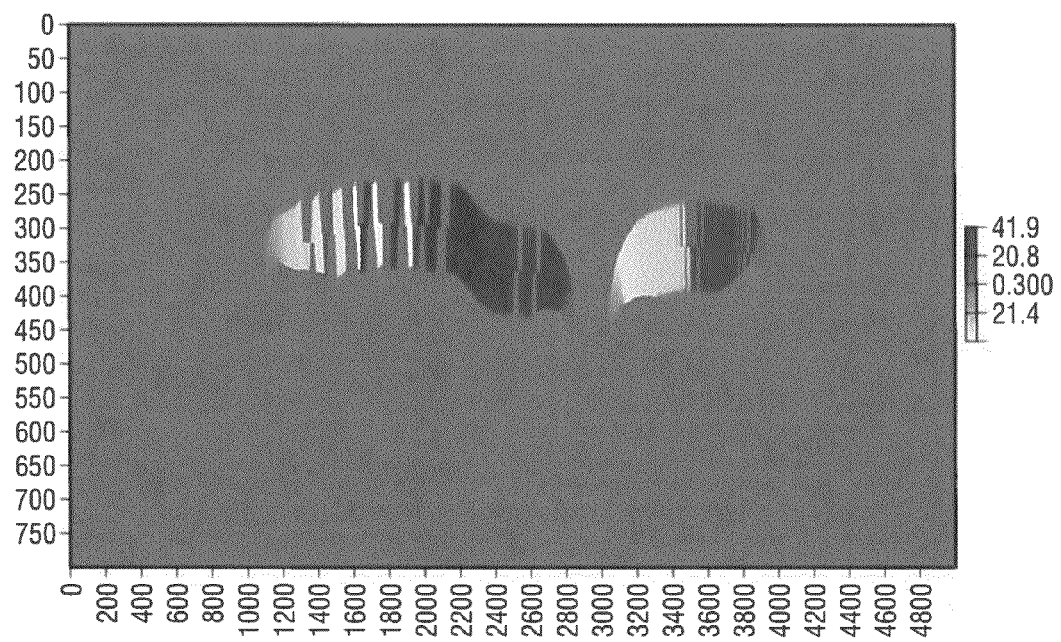
FIG. 14 is an example graph showing the steepest descent force on the level set function when the salt geometry is shrunk (X component), in accordance with the present disclosure.
Figure 15:
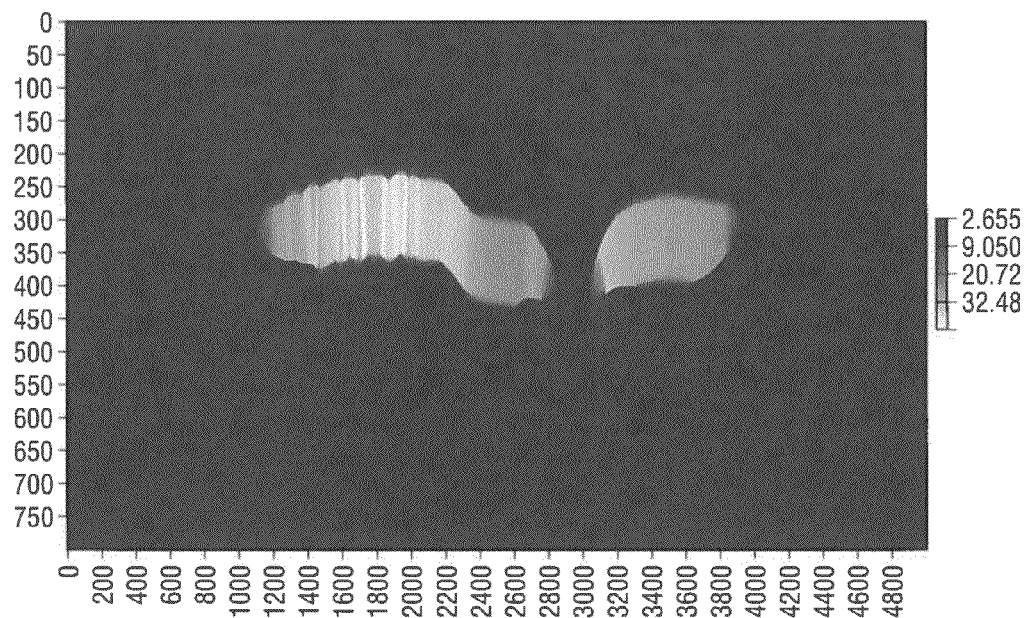
FIG. 15 is an example graph showing the steepest descent force on the level set function when the salt geometry is shrunk (Z component), in accordance with the present disclosure.

The behavior of the objective function as the salt geometry is shrunk (negative axis) or expanded (positive axis) can be seen in FIG. 11. As can be seen, the objective function is minimum at the true geometry (i.e., at zero) and increases as the geometry is shrunk or expanded. The steepest descent force acting on the level set boundary in both cases can be seen in FIGS. 12-15, where FIGS. 12 and 13 show the expanded case for the X and Z components, respectively, and FIGS. 14 and 15 show the shrunk case for the X and Z components, respectively. It can be observed that forces of opposite polarity act on the salt boundary when the salt is expanded, as compared to when the salt body is shrunk.

Figure 16:
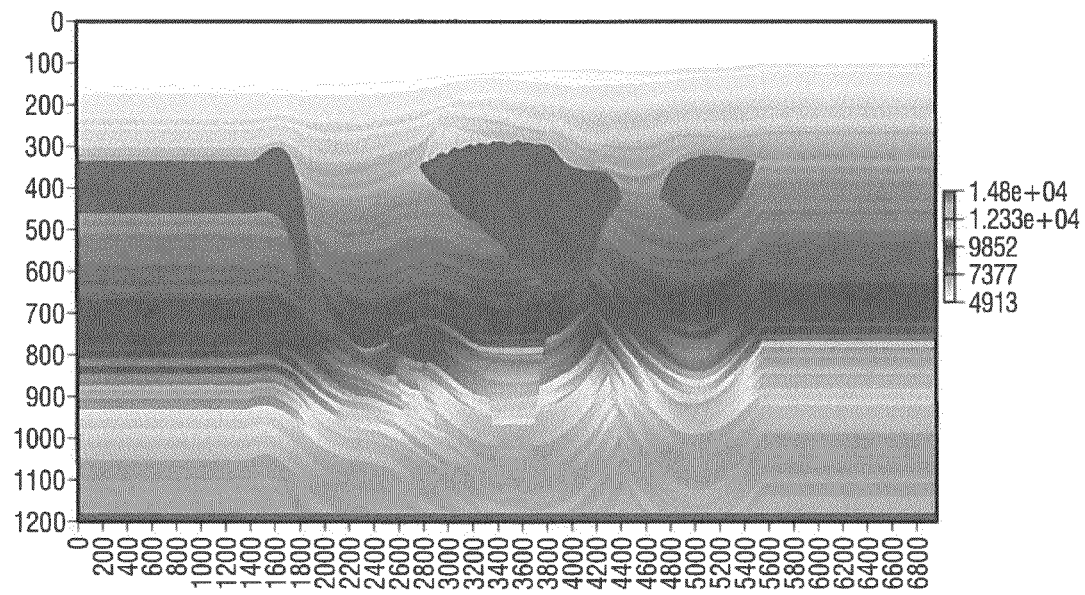
FIG. 16 is an example plot of an alternative embodiment velocity model, in accordance with the present disclosure.

An alternative embodiment was tested using the subsalt multiples attenuation and reduction technology (SMAART) Pluto 1.5 model. The true velocity model is shown in FIG. 16. The observed data were again synthetically generated using an acoustic propagator with true velocity and true density. The acquisition geometry and other parameters were kept the same as those of the original Pluto 1.5 dataset.

To generate the starting model for the inversion, the entire salt boundary was expanded by a normal force to the surface. The background sediment velocity and density was assumed to be known and kept unchanged throughout the inversion. The inversion using the level set approach was run starting with the expanded salt model with a 3-Hz low-pass filter applied to both the predicted and observed data. As the salt geometry was updated in the inversion, both the velocity model and the density model were updated with the new salt geometries using the exact values (or substantially similar or equivalent values) of velocity and density for the salt bodies.

Figure 17:
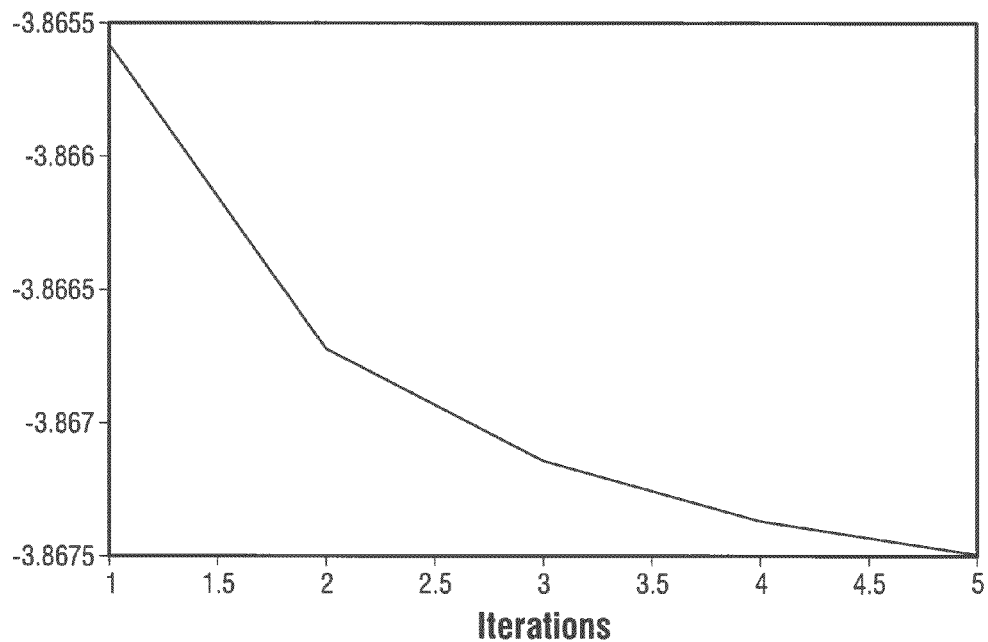
FIG. 17 is an example plot of the data misfit versus iterations for the inversion on the alternative embodiment (of FIG. 16) dataset, in accordance with the present disclosure.
Figure 18:
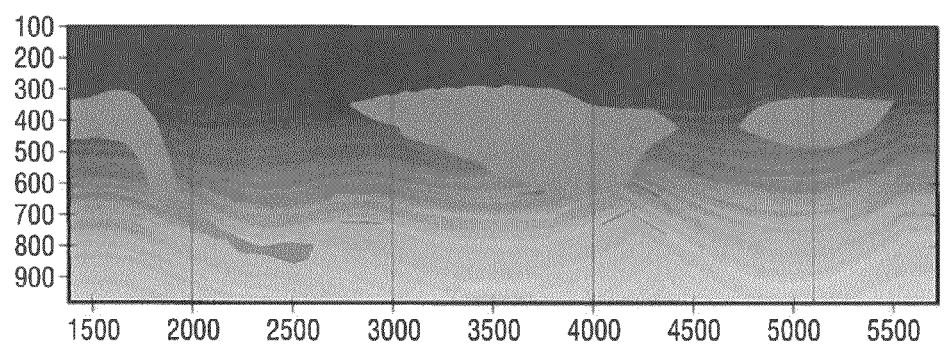
FIG. 18 shows the location of the velocity profiles for the inversion on the alternative embodiment (of FIG. 16) dataset, in accordance with the present disclosure.
Figure 19:
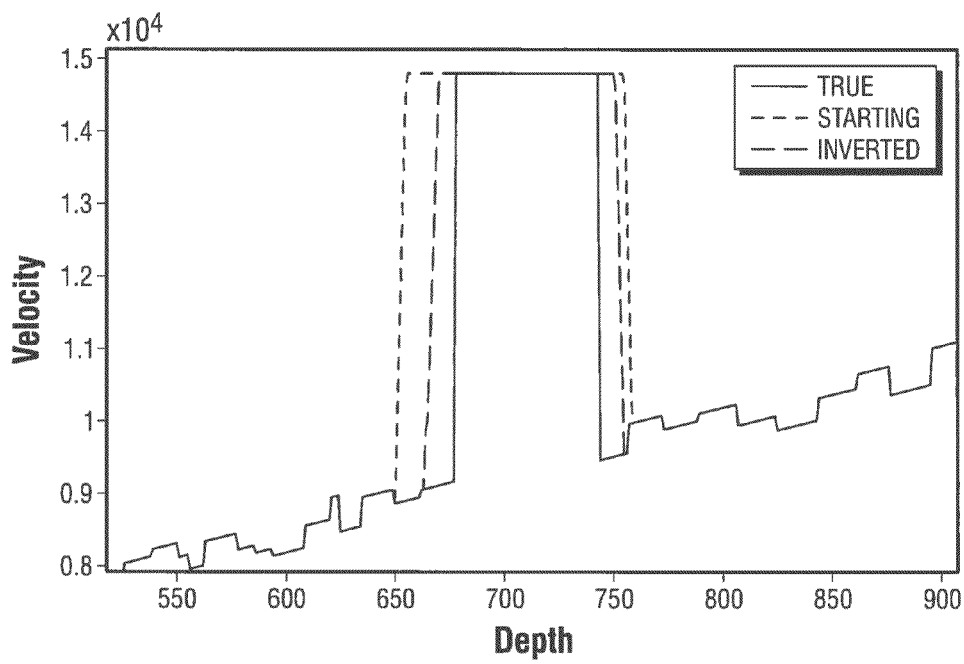
FIG. 19 is an example plot showing the velocity depth profiles with true velocity, starting velocity, and inverted velocity at x=2000 in the alternative embodiment (of FIG. 16) dataset, in accordance with the present disclosure.
Figure 20:
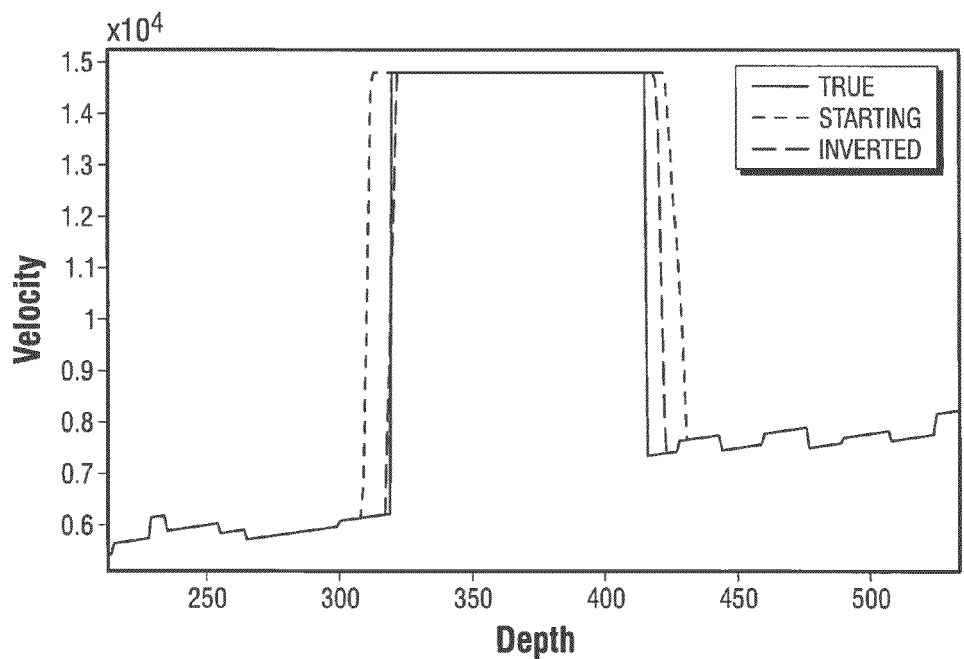
FIG. 20 is an example plot showing the velocity depth profiles with true velocity, starting velocity, and inverted velocity at x=3000 in the alternative embodiment (of FIG. 16) dataset, in accordance with the present disclosure.
Figure 21:
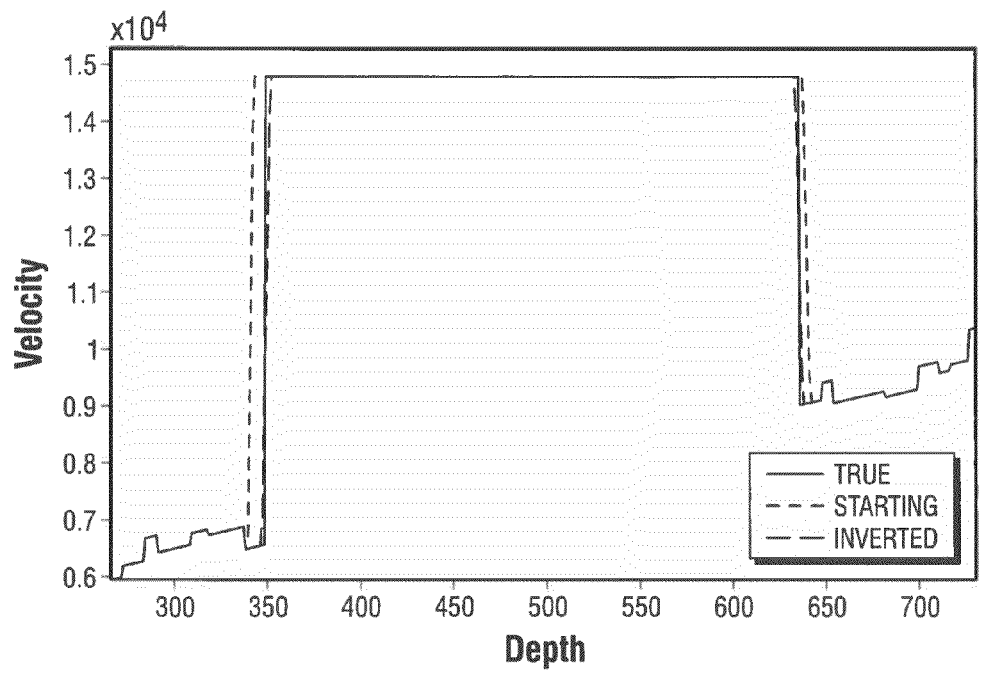
FIG. 21 is an example plot showing the velocity depth profiles with true velocity, starting velocity, and inverted velocity at x=4000 in the alternative embodiment (of FIG. 16) dataset, in accordance with the present disclosure.
Figure 22:
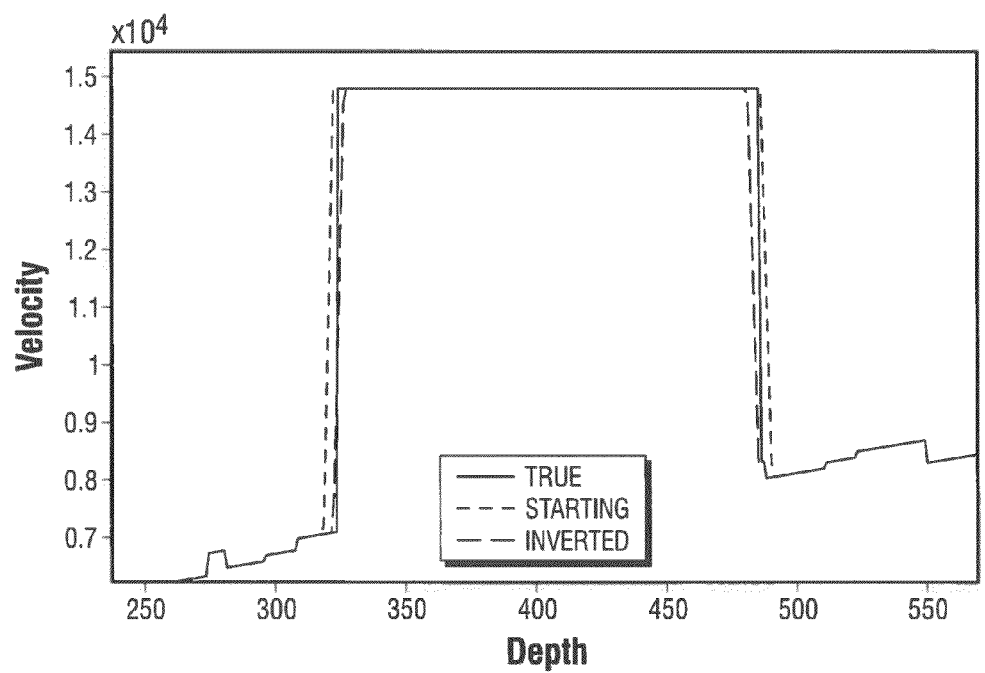
FIG. 22 is an example plot showing the velocity depth profiles with true velocity, starting velocity, and inverted velocity at x=5100 in the alternative embodiment (of FIG. 16) dataset, in accordance with the present disclosure.

The objective function behavior along the iterations as the inversion progresses is shown in FIG. 17. FIG. 18 shows the locations from which the depth profiles were extracted. FIGS. 19-22 show the depth profiles for the four locations at x=2000, 3000, 4000, and 5100, respectively, with true velocity, starting velocity, and inverted velocity plotted after five iterations of the inversion. As can be observed, the inverted solution is approaching the true solution and the inversion is converging.

Figure 23:
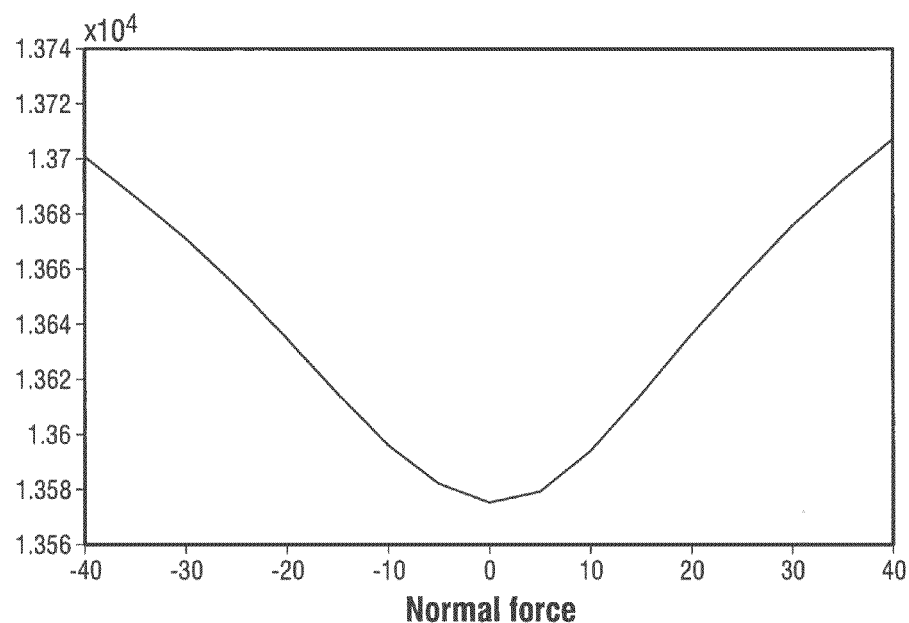
FIG. 23 is an example graph showing the objective function behavior when the salt body in the alternative embodiment (of FIG. 16) dataset is shrunk (negative axis) and expanded (positive axis), in accordance with the present disclosure.
Figure 24:
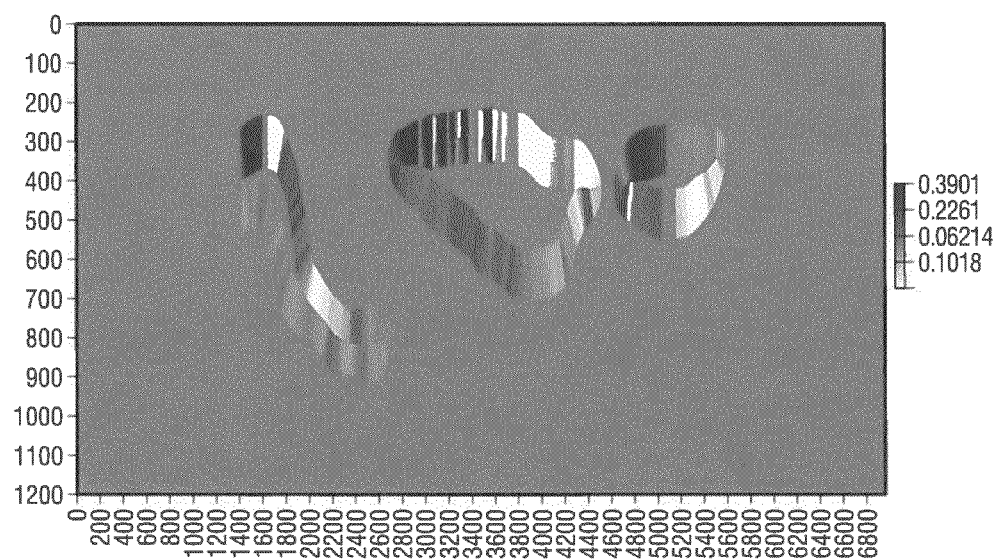
FIG. 24 is an example graph showing the steepest descent force acting on the salt boundary when the salt body is expanded in the alternative embodiment (of FIG. 16) dataset (X component), in accordance with the present disclosure.
Figure 25:
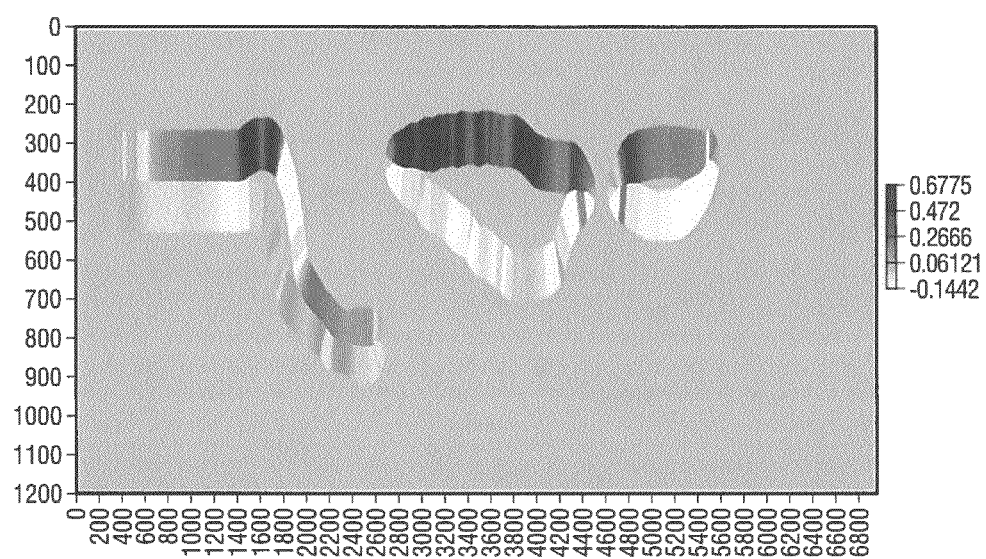
FIG. 25 is an example graph showing the steepest descent force acting on the salt boundary when the salt body is expanded in the alternative embodiment (of FIG. 16) dataset (Z component), in accordance with the present disclosure.

The behavior of the objective function as the salt geometry is shrunk (negative axis) or expanded (positive axis) can be seen in FIG. 23. Again, the objective function is minimum at the true geometry (at zero) and increases as the geometry is shrunk or expanded. The steepest descent force acting on the level set boundary when the salt geometry is expanded can be seen in FIGS. 24 and 25 (X and Z components, respectively). As can be seen, the forces act in the right direction with respect to the geometry of the salt bodies.

Figure 26:
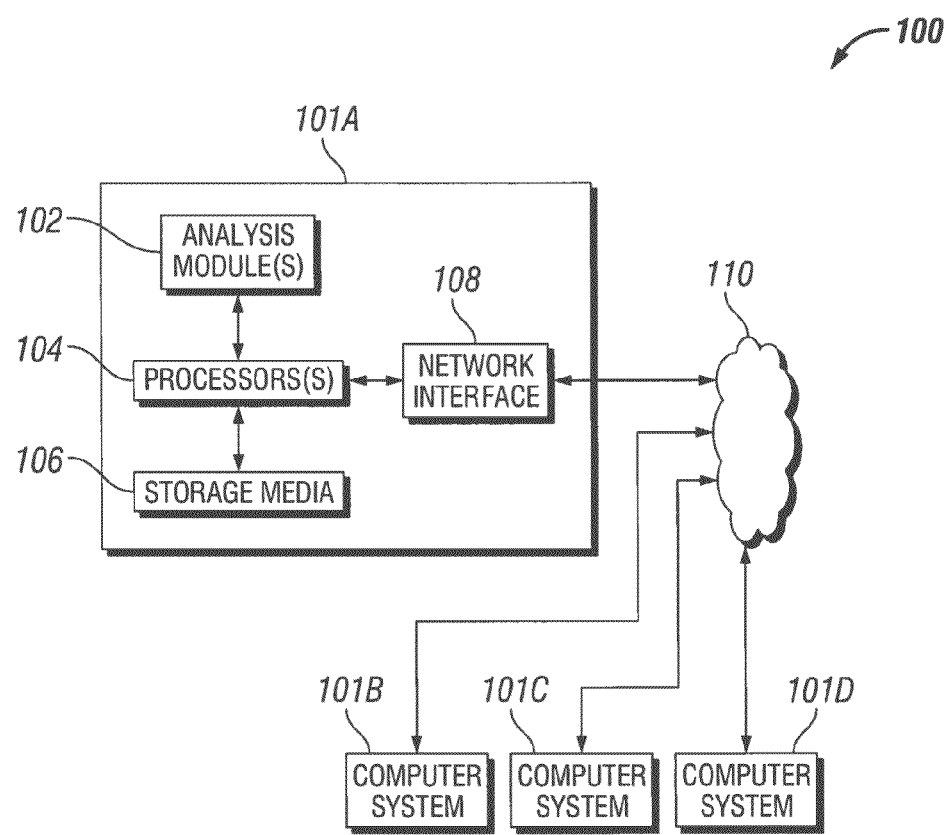
FIG. 26 illustrates a computing system, in accordance with the present disclosure.

The computing system 100 shown in FIG. 26 can be an individual computer system 101A or an arrangement of distributed computer systems. The computer system 101A includes one or more analysis modules 102 that are configured to perform various tasks according to some embodiments, such as one or more methods disclosed herein (e.g., any of the steps, methods, techniques, and/or processes, and/or combinations and/or variations and/or equivalents thereof). To perform these various tasks, analysis module 102 executes independently, or in coordination with, one or more processors 104, which is (or are) connected to one or more storage media 106. The processor(s) 104 is (or are) also connected to a network interface 108 to allow the computer system 101A to communicate over a data network 110 with one or more additional computer systems and/or computing systems, such as 101B, 101C, and/or 101D (note that computer systems 101B, 101C and/or 101D may or may not share the same architecture as computer system 101A, and may be located in different physical locations, e.g., computer systems 101A and 101B may be on a ship underway on the ocean, while in communication with one or more computer systems such as 101C and/or 101D that are located in one or more data centers on shore, on other ships, and/or located in varying countries on different continents).

A processor can include a microprocessor, microcontroller, processor module or subsystem, programmable integrated circuit, programmable gate array, or another control or computing device.

The storage media 106 can be implemented as one or more computer-readable or machine-readable storage media. Note that while in the example embodiment of FIG. 26 storage media 106 is depicted as within computer system 101A, in some embodiments, storage media 106 may be distributed within and/or across multiple internal and/or external enclosures of computing system 101A and/or additional computing systems. Storage media 106 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

It should be appreciated that computing system 100 is only one example of a computing system, and that computing system 100 may have more or fewer components than shown, may combine additional components not depicted in the example embodiment of FIG. 26, and/or computing system 100 may have a different configuration or arrangement of the components depicted in FIG. 26. For example, though not shown explicitly, computing system 100 would generally include input and output devices such as a keyboard, a mouse, a display monitor, and a printer and/or plotter. The various components shown in FIG. 26 may be implemented in hardware, software, or a combination of both hardware and software, including one or more signal processing and/or application specific integrated circuits.

While certain implementations have been disclosed in the context of seismic data collection and processing, those of ordinary skill in the art will recognize that the disclosed method can be applied in many fields and contexts where data involving structures arrayed in a three-dimensional space may be collected and processed, e.g., medical imaging techniques such as tomography, ultrasound, magnetic resonance imaging (MRI) and the like, SONAR and LIDAR imaging techniques and the like.

Further, the steps in the processing methods described above may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of protection of the invention.

While only certain embodiments have been set forth, alternatives and modifications will be apparent from the above description to those skilled in the art. These and other alternatives are considered equivalents and within the scope of this disclosure and the appended claims. Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, paragraph 6 for any limitations of any of the claims herein, except for those in which the claim expressly uses the words 'means for' together with an associated function.

What is claimed is:

1. A method, comprising:

receiving, by a system including a processor, acquired data corresponding to a subsurface geological formation, wherein the acquired data includes data corresponding to a subsurface body having a geometry and a subsurface region, wherein the subsurface body comprises a geological formation body, and the subsurface region comprises a sediment region;

directly inverting, by the system, into an inversion domain at least part of the subsurface body geometry, wherein the direct inverting comprises:

partitioning the inversion domain into a first partitioned region and a second partitioned region, wherein the first partitioned region corresponds at least in part to the geological formation body, and the second partitioned region corresponds at least in part to the sediment region;

using a level set representation to parameterize the subsurface body geometry;

defining an implicit model using a level set function;

generating an objective function using the level set function;

determining a gradient of the objective function;

at an iteration of the direct inverting, perturbing a level set boundary by evolving the level set function using the gradient; and stopping an evolution of the level set function responsive to at least one predetermined criterion being satisfied; and determining the geometry of the subsurface body based on the direct inverting.

2. The method of claim 1, wherein the geological formation body is a salt body, and wherein the first partitioned region corresponds at least in part to the salt body.

3. The method of claim 1, wherein the direct inverting further comprises:
mapping the implicit model onto a grid,
wherein stopping the evolution of the level set function responsive to the at least one predetermined criterion being satisfied comprises stopping the evolution of the level set function responsive to a step length along a time dimension meeting one or more predetermined conditions, the step length along the time dimension being a time step.

4. The method of claim 3, further comprising determining a direction for the time step using a technique selected from the group consisting of a steepest descent direction, a conjugate gradient direction, a Newton direction, and a quasi-Newton direction.

5. The method of claim 3, wherein the direct inverting further comprises, if using a steepest descent method to determine a direction for the time step, using a negative of the gradient as a force acting on the level set boundary to evolve the level set function.

6. The method of claim 3, further comprising providing a continuous extension of the gradient off of the level set boundary.

7. The method of claim 3, wherein the direct inverting further comprises, if the gradient is defined only on the level set boundary and a level set evolution equation is used to evolve the level set function:
choosing the level set function to be a signed distance function;
constructing the signed distance function; and
computing a constant extrapolation of the gradient along a direction normal to a boundary of the inversion domain.

8. The method of claim 3, wherein the evolving of the level set function comprises using an equation of motion.

9. The method of claim 3, wherein the objective function is a least-squares formulation.

10. The method of claim 1, wherein a zero level set of the level set function represents a boundary of the inversion domain.

11. The method of claim 1, wherein the direct inverting further comprises determining a misfit between the acquired data and synthetic data, wherein the direct inverting produces an output model, and the synthetic data is generated from the output model.

12. The method of claim 1, wherein the level set representation is positive if representing the first partitioned region and negative if representing the second partitioned region.

13. The method of claim 1, wherein the direct inverting comprises a full waveform inversion.

14. The method of claim 1, further comprising plotting velocity profiles of the subsurface body.

15. A method, comprising:
receiving, by a system including a processor, acquired data corresponding to a subsurface geological formation, wherein the acquired data includes data corresponding to a subsurface body having a geometry and a subsurface region, wherein the subsurface body comprises a geological formation body, and the subsurface region comprises a sediment region;

performing, by the system, a full waveform inversion using a level set representation to parameterize the subsurface body geometry, wherein performing the full waveform inversion using the level set representation comprises:
partitioning an inversion domain of the full waveform inversion into a first partitioned region corresponding at least in part to the geological formation body, and a second partitioned region corresponding at least in part to the sediment region;
defining an implicit model using a level set function;
generating an objective function using the level set function;
determining a gradient of the objective function;
at an iteration of the full waveform inversion, perturbing a level set boundary by evolving the level set function using the gradient; and
stopping an evolution of the level set function responsive to at least one predetermined criterion being satisfied; and
determining the geometry of the subsurface body based on the full waveform inversion.

16. The method of claim 15, wherein stopping the evolution of the level set function responsive to the at least one predetermined criterion being satisfied comprises stopping the evolution of the level set function responsive to a step length along a time dimension meeting one or more predetermined conditions.

17. A computing system comprising at least one processor, at least one memory, and one or more programs stored in the at least one memory, wherein the one or more programs comprise instructions, which when executed cause the at least one processor to:
receive acquired data corresponding to a subsurface geological formation, wherein the acquired data includes data corresponding to a subsurface body having a geometry and a subsurface region, wherein the subsurface body comprises a geological formation body, and the subsurface region comprises a sediment region;
perform inversion using a level set representation to parameterize the subsurface body geometry, wherein performing the inversion comprises:
partitioning an inversion domain of the inversion into a first partitioned region corresponding at least in part to the geological formation body, and a second partitioned region corresponding at least in part to the sediment region;
defining an implicit model using a level set function;
generating an objective function using the level set function;
determining a gradient of the objective function;
at an iteration of the inversion, perturbing a level set boundary by evolving the level set function using the gradient; and
stopping an evolution of the level set function responsive to at least one predetermined criterion being satisfied; and
determine the geometry of the subsurface body based on the inversion.

18. The computing system of claim 17, wherein the geological formation body is a salt body, and wherein the first partitioned region corresponds at least in part to the salt body.

19. The computing system of claim 17, wherein a zero level set of the level set function represents a boundary of the inversion domain of the inversion.

* * * * *